(12) United States Patent
Qin et al.

(10) Patent No.: US 11,662,583 B2
(45) Date of Patent: May 30, 2023

(54) OPTICAL COMBINER WITH INTEGRATED PRESCRIPTION OPTICAL CORRECTION AND METHOD OF MANUFACTURING THE SAME

(71) Applicant: GOOGLE LLC, Mountain View, CA (US)

(72) Inventors: Yi Qin, Mountain View, CA (US); Ozan Cakmakci, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 17/071,646

(22) Filed: Oct. 15, 2020

(65) Prior Publication Data

US 2022/0121029 A1 Apr. 21, 2022

(51) Int. Cl.
*G02B 27/01* (2006.01)
*G02C 7/02* (2006.01)

(52) U.S. Cl.
CPC ......... *G02B 27/0172* (2013.01); *G02C 7/027* (2013.01); *G02B 2027/013* (2013.01); *G02B 2027/0178* (2013.01)

(58) Field of Classification Search
CPC .......... G02B 27/0172; G02B 2027/013; G02B 2027/0178; G02C 7/086; G02C 7/027
See application file for complete search history.

(56) References Cited

U.S. PATENT DOCUMENTS

| | | | | |
|---|---|---|---|---|
| 10,890,707 | B2* | 1/2021 | Waldern | G02B 26/0808 |
| 2001/0021068 | A1* | 9/2001 | Togino | H04N 5/7408 |
| | | | | 348/E5.145 |
| 2012/0162549 | A1* | 6/2012 | Gao | G02B 6/003 |
| | | | | 359/651 |
| 2016/0252724 | A1* | 9/2016 | Nikkhoo | G02B 6/0043 |
| | | | | 359/630 |
| 2017/0010465 | A1* | 1/2017 | Martinez | G02B 27/017 |
| 2017/0123207 | A1 | 5/2017 | Kress et al. | |
| 2020/0096772 | A1* | 3/2020 | Adema | G02B 6/005 |

FOREIGN PATENT DOCUMENTS

| | | | | |
|---|---|---|---|---|
| WO | WO-2005076869 A2 * | 8/2005 | | G02B 23/14 |
| WO | 2020113245 A2 | 6/2020 | | |

OTHER PUBLICATIONS

Wu, Jui-Yi et al., "Prescription AR: A fully-customized prescription-embedded augmented reality display", Optics Express; Mar. 2, 2020; vol. 28, No. 5; pp. 6225-6241.

\* cited by examiner

*Primary Examiner* — Kwang-Su Yang

(57) ABSTRACT

A head mounted display includes a combiner configured to receive display light from a micro-display. The world-facing surface of the combiner has a curvature that corresponds to a user's vision correction prescription. The head mounted display also includes a corrective layer having a second curvature that corresponds to the user's vision correction prescription. The corrective layer is disposed on the eye-facing surface of the combiner such that the focal point of the display light is adjusted for the specific user as the display light exits the combiner towards the user's eye.

18 Claims, 4 Drawing Sheets

OPTICAL COMBINER WITH INTEGRATED PRESCRIPTION OPTICAL CORRECTION AND METHOD OF MANUFACTURING THE SAME

BACKGROUND

In the field of optics, a combiner is an optical apparatus that combines two light sources, for example, light transmitted from a micro-display and directed to the combiner via a waveguide, and environmental light from outside of the combiner. Optical combiners are used in heads up displays (HUDs), sometimes referred to as head mounted displays (HMDs) or near-eye displays, which allow a user to view computer generated content (e.g., text, images, or video content) superimposed over a user's environment viewed through the HMD, creating what is known as augmented reality (AR). The HMD enables a user to view the computer-generated content without having to significantly shift his or her line of sight. Conventional near-to-eye displays are not well suited for users that require prescription corrective lenses as HMDs can physically interfere with conventional prescription corrective glasses because they are necessarily worn close to a user's eye, thus limiting the vertex distance available for corrective and display components.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
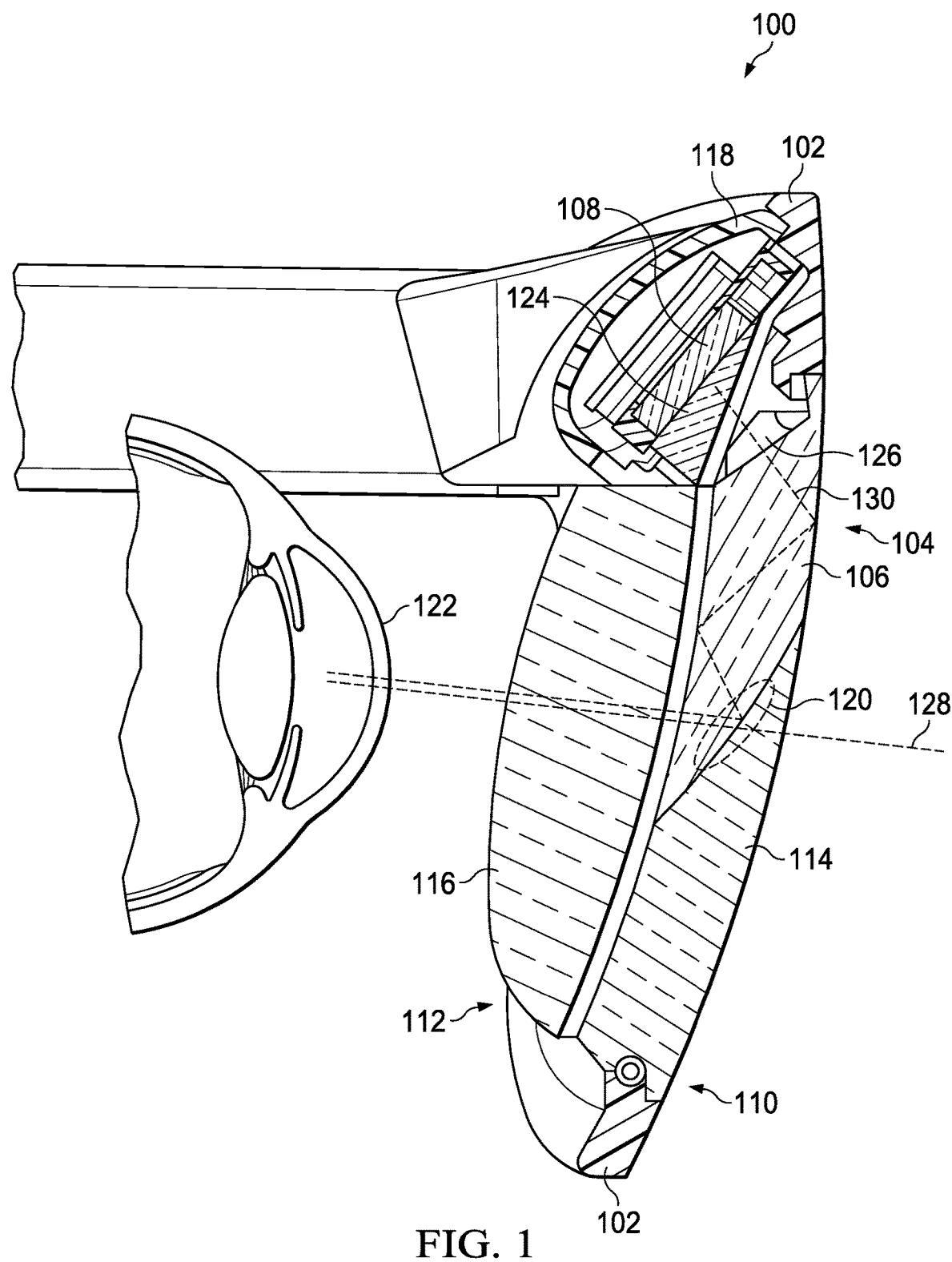
FIG. 1 illustrates a lateral cross-section of an HMD including a combiner with an integrated prescription mounted within a frame in accordance with at least one embodiment.

Conventional methods for including a corrective optical prescription in an HMD primarily require configuring the display to accommodate a separate prescription lens, either as part of eye-glasses worn by the user or as a lens that is inserted into or attached to a combiner of the HMD. The result is often a bulky system that can be uncomfortable for a user to wear, thus detracting from the user experience. Further, boundary lines of a corrective prescription lens included in a combiner as an insert or attachment are often visible to the user, which also detracts from the user experience.

There are also complications in simultaneously correcting both the light from within the combiner and the environmental light such that a user does not experience optical aberrations when viewing an augmented reality scene. For example, if a corrective lens is positioned the world-facing side (i.e., the side facing away from a user) of an optical combiner, then light representing the computer generated content, which is traveling within the combiner, does not receive any prescriptive correction and will appear out of focus to the user. Further, if a corrective lens is positioned over the eye-ward side (i.e., the side facing towards a user) of an optical combiner, the strength of the prescription lens is limited by the vertex distance (i.e., the space available between the combiner and the user's eye). This is due to the fact that a stronger prescription (i.e., larger diopter) requires the corrective lens to be thicker, whether at the edges of the lens (as in nearsighted vision correction) or in the center of the lens (as in farsighted vision correction), which can potentially bump into a user's cheek or eyelashes.

Using the techniques described herein, a corrective prescription is integrated directly into a combiner of an HMD. This integration can reduce bulk and weight of the HMD, as well as increase the range of prescription diopters that can be accommodated by the HMD. One challenge of integrating the corrective prescription is that, while combiners can be formed from the same material typically used in the manufacturing of prescription lenses, such as, for example, optical grade polycarbonate plastic or a urethane-based monomer material, the combiner also includes specialized layers and components to facilitate transmission of light from a light source, through a volume of the combiner, and then out of the combiner towards a user's eye. Using the techniques disclosed herein, the manufacturing of a combiner with an integrated corrective prescription allows the layers and components of the combiner to remain unaltered, while also delivering high quality prescription vision correction tailored to the individual user.

Prescription eyeglasses lens have two curved surfaces of consequence to the vision of the wearer: the eye-side surface and the world-side surface. The corrective power of a lens is determined by adding the degree of curvature of eye-side surface and the degree of curvature of the world-side surface. For any given corrective power, an infinite number of curve combinations may be used to achieve the same result. Prescription lenses for eyeglasses are typically made from a pre-formed disk of polycarbonate plastic, called a blank, with one side being flat and the other side having a convex curvature corresponding to the world-side curvature described by a user's specific prescription. Material from the flat side is then cut or ground away utilizing specialized equipment to form the eye-side curvature according to the user's prescription. The edges of the resulting lens are then shaped to fit into a frame to be worn by the user.

FIGS. 1-4 illustrate embodiments of optical combiners that include integrated prescription optical correction and methods of manufacturing the same. An optical combiner with an integrated prescription can be manufactured in much the same way as conventional eyeglass lenses. For example, by creating a "blank" formed from layers of material having specialized coatings and/or embedded physical features and then cutting the eye-side and world-side surfaces of the blank according to the specific curvatures called for by a user's prescription. The edges of the resulting combiner/prescription lens can then be shaped to fit into an HMD or other near-to-eye display system.

FIG. 1 illustrates a lateral cross-section of an HMD 100 including a combiner 104 mounted within a frame 102 in accordance with at least one embodiment. The HMD 100 employs an eyeglass form factor with an eyeglass frame 102 in which a combiner 104 is housed. The combiner 104 includes a waveguide prism 106 located at the upper portion of the world-side 110 of the combiner 104 and a compensation prism 114 located at the lower portion of the world-side 110 of the combiner 104. The waveguide prism 106 is configured to act upon light traveling within the waveguide prism 106 to change at least one of: the direction that the light is traveling, the polarization state of the light, and the angle at which light is refracted or reflected. These changes facilitate conveyance of light within the waveguide prism 106 to an outcoupler region 120, where the light is then directed out of the waveguide prism 106 towards a user's eye.

The waveguide prism 106 is positioned within the frame 102 to receive display light 130 from a micro-display 108 mounted within a housing 118 at the top of the frame 102. The micro-display 108 is connected to computing components (not shown) responsible for providing computer generated content to the micro-display 108. In some embodiments, computer generated content includes video content, images, or text that is intended to be viewed by a user wearing the HMD 100. Light emitted from the micro-display is conveyed through a field lens 124, which acts to align the light in a parallel fashion so that the light has minimal spread as it propagates within the waveguide prism 106. After being collimated at the field lens 124, the light is transmitted into the combiner 104 at an incoupler region 126 as display light 130.

Coupled to the waveguide prism 106 is the compensation prism 114, which is shaped to be complementary to the waveguide prism 106 such that the combined waveguide prism 106 and compensation prism 114 form the combiner 104 having a lens-like shape configured to be mounted within the frame 102. Thus, the world-side 110 of the combiner 104 includes the waveguide prism 106 and the compensation prism 114 and can be configured to have a curvature that corresponds to a user's corrective prescription. The compensation prism 114 is formed from a transparent optical material, such as that used to form the waveguide prism 106, which allows light from the environment 128 to be transmitted through the combiner 104 such that the light from the environment 128 is combined with display light 130 conveyed from the waveguide prism 106 to present the user's with an image overlaying the user's environment.

The eye-side 112 of the combiner is comprised of a correction layer 116 formed from optical grade transparent material and configured to have a curvature corresponding to a user's prescription. The waveguide prism 106 and compensation prism 114 can be formed of the same or similar material to that of the correction layer 116. Additionally, as described below with reference to FIG. 2, other layers of materials or coatings may be included on or between the waveguide prism 106, the compensation prism 114, and the correction layer 116 to impart the combiner 104 with specific light interaction properties.

In order to present an image for viewing by a user, the micro-display 108 directs light 130 to the field lens 124, where the light is collimated and transmitted into the waveguide prism 106 portion of the combiner 104 via the incoupler region 126. The display light 130 (or representation thereof) is then transmitted within and along the waveguide prism 106 to an outcoupler region 120 of the waveguide prism 106. The outcoupler region 120 is configured to reflect the representation of the display light 130 at an angle less than the critical angle so that the representation of the display light 130 is directed out of the combiner 104, through the correction layer 116, towards a user's eye 122. The combination of display light 130 reflected from the outcoupler region 120 and environmental light 128 transmitted through the combiner 104 from the world-side 110 create an AR scene viewable by the user. As the display light 130 representing an image and the environmental light 128 both travel through the correction layer 116, the user will see both the image and the environmental scene in focus.

Figure 2:
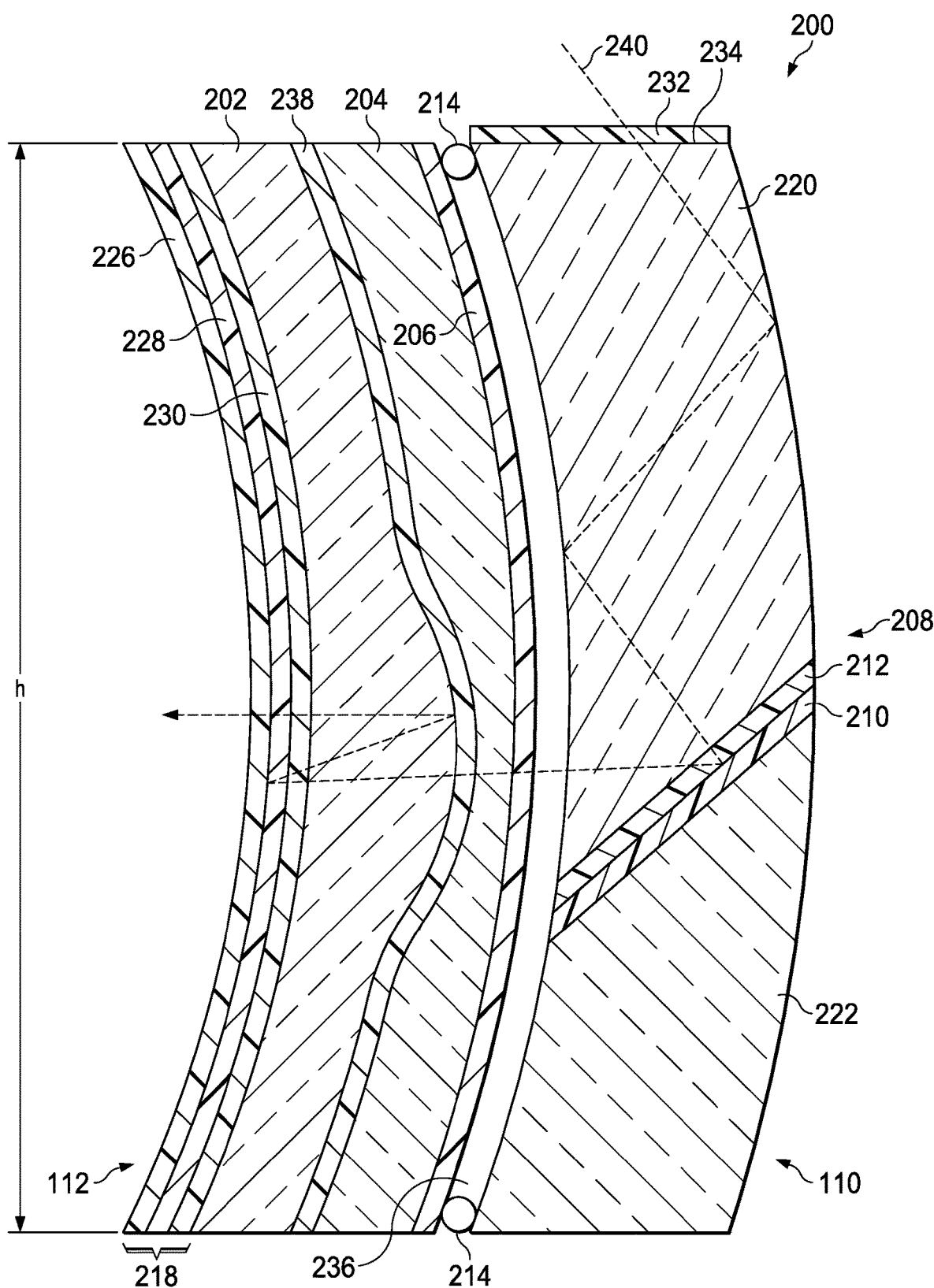
FIG. 2 is a diagram illustrating expanded cross-section of the layers of an example combiner with integrated prescription in accordance with some embodiments.

FIG. 2 illustrates an expanded cross-section of the layers of an example combiner 200 in accordance with some embodiments. The combiner may be similar to the combiner 104 illustrated in FIG. 1 and is described with reference to the world-side 110 and the eye-side 112 of the combiner 200 when employed in an HMD 100 such as illustrated in FIG. 1. Starting from the eye-side 112 of the combiner 200, a first layer 202 is provided that is formed from transparent optical grade material and configured to have a curvature, facing a user's eye, that corresponds to the diopter of user's prescription. The first layer 202 is also has a convex curvature, with respect to the eye-side 112 of the combiner 200, on its world-side 110 surface. Disposed on the world-side 110 surface of the first layer is a partial mirror coating 238. A second layer 204, formed from transparent optical grade material, is disposed on the world-side 110 surface of the first layer 202 and configured to have a concave curvature on its eye-side 112 surface that corresponds to the convex curvature of the first layer 202. A third layer 206 comprising a quarter wave plate (QWP) and an anti-reflective film is disposed on the world-side 110 surface of the second layer 204. The QWP serves to alter the polarization state of a light wave as it is transmitted through the QWP. While the first 202, second 204, and third 206 layers may differ in thickness, each of the layers is configured to span the vertical height (h) of the combiner.

Continuing from the eye-side 112 of the combiner 200, a fourth layer 208 or outermost layer on the world-side 110 of the combiner 200, includes a waveguide prism 220 vertically coupled to a compensation prism 222 with a PBS film layer 210 and a linear polarization film layer 212 disposed therebetween at an outcoupling region 224. The waveguide prism 220 and the compensation prism 222 each have a vertical height that is less than the vertical height (h) of the combiner 200 but such that the total vertical height of the fourth layer 208 is equal to the height of the combiner 200. In order to maintain an air gap 236 between the third layer 206 and fourth layer 208, microspheres 214 are placed between the third layer 206 and fourth layer 208.

According to some embodiments, an output film stack layer 218 is disposed on the eye-side 112 surface of the first layer 202. The output film stack layer 218 is composed of linear polarization film 226, PBS film 228, and QWP film 230. In addition, a linear polarization film layer 232 can be bonded to the top edge 234 of the waveguide prism 220 such that, when the combiner 200 is employed in an HMD, such as the HMD 100 illustrated in FIG. 1, the linear polarization film layer 232 is disposed between the field lens 124 and the waveguide prism 220. Thus, display light from a micro-display is linearly polarized before entering into the waveguide prism 220.

With the described configuration of FIG. 2, in an embodiment where display light 240 is provided to the combiner 200 from a micro-display (not shown), the display light 240 is linearly polarized as it is transmitted through the linear polarization film layer 232 into the waveguide prism 220. Though the information carried by the display light 240 (i.e., the computer generated content) remains unchanged, at least one property of the display light 240 is altered by the linear polarization film layer 232, thus light within the waveguide prism 220 will be referred to as a representation of the display light 240. The representation of the display light 240 travels through the volume of the waveguide prism 220 until it is incident upon the world-side 110 surface of the waveguide prism 220 at an angle greater than the critical angle for the representation of the display light 240 to be totally internally reflected, which is determined based on the material from which the waveguide prism is formed and the environmental medium (e.g., air or water). The reflected representation of the display light 240 travels back through the volume of the waveguide prism 220 and is reflected from the eye-side 112 surface of the waveguide prism 220. Depending on the vertical length of the waveguide prism 220 and the angles at which the representation of the display light 240 is reflected, multiple reflections of the representation of the display light 240 can occur before the representation of the display light 240 is incident on the polarization film layer 212 disposed at the outcoupling region 224.

The representation of the display light 240 is then transmitted through the polarization film 212 to PBS film 210, where it is reflected toward the eye-side 112 surface of the waveguide prism 220 at an angle less than the critical angle for the material from which the waveguide prism 220 is formed and the air within the air gap 236. Accordingly, the representation of the display light 240 is transmitted through the eye-side 112 surface of the waveguide prism 220, through the air gap 236, and through the third layer 206 where the polarization state of the representation of the display light 240 is converted from linear to circular polarization. The circularly polarized representation of the display light 240 then continues through the second layer 204, and through the first layer 202 to the QWP film 230. As the representation of the display light 240 passes through the QWP film 230 it is linearly polarized such that upon incident at PBS film 228, the linearly polarized representation of the display light 240 is reflected back through the QWP film 230 where it is again circularly polarized. The circularly polarized representation of the display light 240 travels through the first layer 202 and is reflected by the partial mirror coating 238, which results in reversal of the handedness of the circular polarization. The representation of the display light 240 travels back through the first layer 202 and through the QWP film 230, where its circular polarization is converted to a linear polarization state that is orthogonal to the linear polarization state when the representation of the display light first passed through the QWP film 230. The representation of the display light 240, having a linear polarization which is transmissible though PBS film 228, passes through the PBS film 228 and the linear polarization film 226 to exit the combiner towards a user's eye.

The angles at which the representation of the display light 240 travels and is reflected between the eye-side 112 surface and world-side 110 surface depicted in FIG. 2 are exemplary only and may vary based on the configuration of the combiner 200. Furthermore, the curvatures of the first layer 202, second layer 204, third layer 206, and output film stack layer 218 are exemplary only and may vary based on an individual user's prescription.

Figure 3:
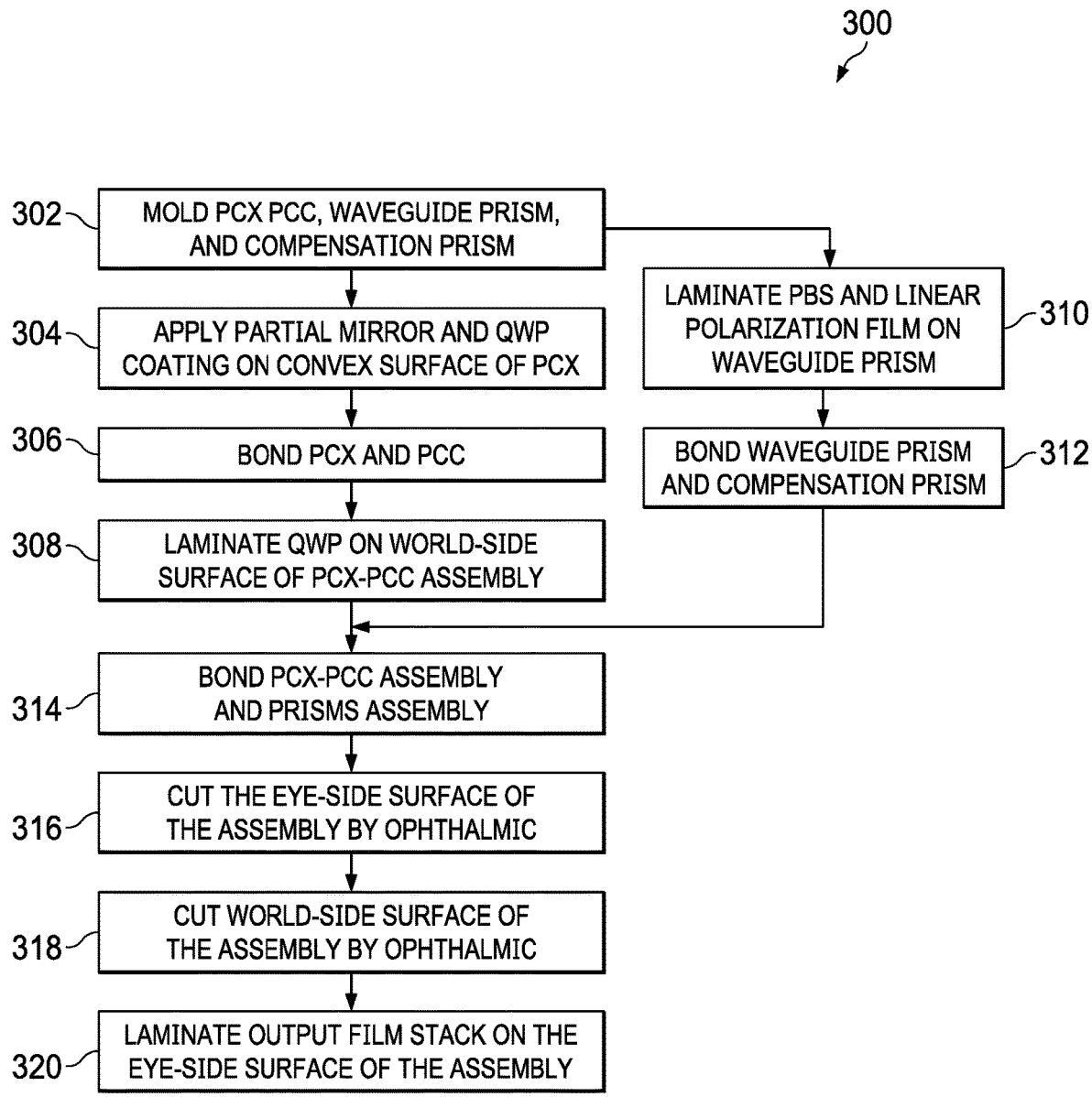
FIG. 3 is a block diagram of a method of manufacturing a combiner with integrated prescription in accordance with some embodiments.

FIG. 3 is a block diagram of a method 300 of manufacturing a combiner, such as the combiner 200 illustrated in FIG. 2. At block 302, a plano-convex component (PCX), a plano-concave component (PCC), a waveguide prism component, and a compensation prism component are formed. Injection molding can be used to form the components, though other techniques for molding plastics may be utilized as well. The components can each be formed from the same optical grade transparent material or from a variety of optical grade transparent materials and may be formed as discs or other shapes. The curvatures of the PCX component and PCX component are formed to be complementary to one another such that when bonded, the convex surface of the PCX component fits within the concave surface of the PCX component without gaps. The waveguide prism component is configured to have at least one edge that is complementary to a corresponding edge of the compensation prism component, as further described below with reference to FIG. 4, such that when bonded they form a component having a shape and size that is approximately equal to that of the PCX and PCX components.

At block 304, a partial mirror coating is applied to the convex surface of the PCX component. At block 306, the PCX component is then bonded to the PCX component. A layer of QWP film is then adhered to the planar surface of the PCX component at block 308. A pressure sensitive adhesive can be used to adhere the QWP film to the PCX component. At block 310, a layer of PBS film and a layer of linear polarization film are adhered to a connection edge of the waveguide prism formed at block 302. The PBS film and linear polarization film can be adhered to the waveguide prism using a pressure sensitive adhesive similar to that used to adhere the QWP film to the PCX component. The waveguide prism and compensation prism are then bonded at their connection edges so that the PBS film and linear polarization film are between the two prisms at block 312. The bonded waveguide prism and compensation prism form a complete component having approximately the same size and shape as the PCX and PCX components. At block 314, the waveguide/compensation prism component is bonded to the PCX/PCC component assembly to form a lens blank having a world-side corresponding to the waveguide/compensation prism component and an eye-side corresponding to a planar side of the PCX component.

Optical lens cutting equipment, such as a generator, can be used to cut, or grind, the eye-side of the lens blank to have a curvature corresponding to a user's individual prescription at block 316. Similar equipment can be used to cut the world-side of the lens blank to have a curvature corresponding to the user's individual prescription at block 318. The resulting shaped lens blank can be referred to as a combiner as it contains the features required to convey display light and combine the display light with environmental light to be viewed by the user. Once the eye-side and world-side of the combiner have been shaped, an output film stack layer 218 can be adhered to the eye-side of the combiner at block 320. The completed combiner can then be fitted into an HMD, such as HMD 100 illustrated in FIG. 1, or other near-to-eye display device.

Figure 4:
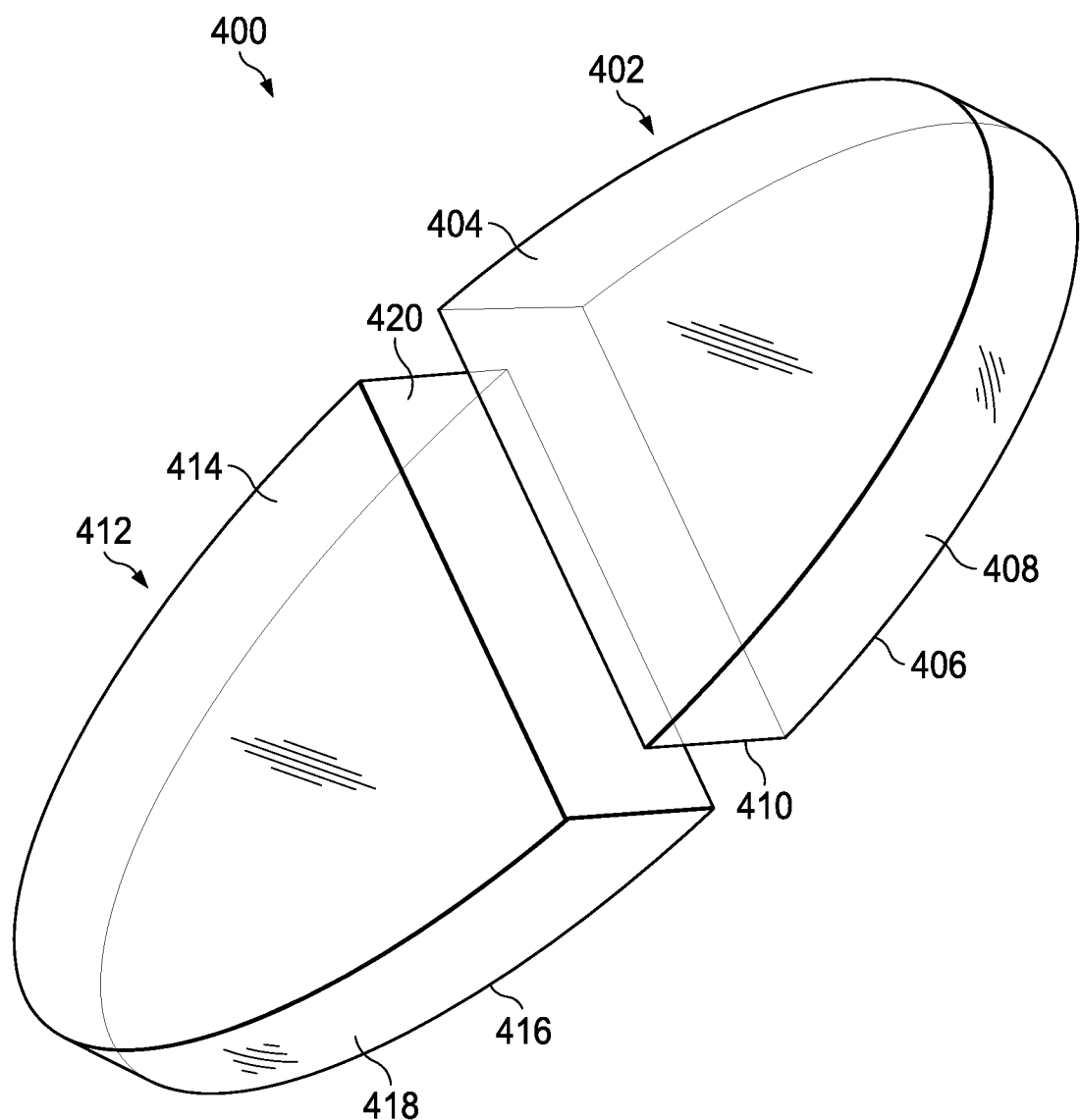
FIG. 4 is an example geometry of the waveguide prism and compensation prism in accordance with some embodiments.

FIG. 4 illustrates an example configuration 400 of a waveguide prism 402 and compensation prism 412, such as the waveguide prism and compensation prism formed at block 302 of FIG. 3. The waveguide prism 402 is formed as a partial disc having a top surface 404, a bottom surface 406, an outer edge 408, and a connection edge 410 at an acute angle to the top surface 404. Though the connection edge 410 is shown as being straight, the connection edge 410 could be curved, wavy, or configured to have protruding features. Furthermore, the connection edge 410 is shown having a consistent angle, with respect to the top surface 404, over the length of the edge. However, the angle may vary, while not exceeding ninety degrees, along the length of the connection edge 410.

The compensation prism 412 is formed as a partial disc having a top surface 414, a bottom surface 416, an outer edge 418, and a connection edge 420 at an obtuse angle to the top surface 414. Though the connection edge 420 of the compensation prism 412 is shown as being straight, the connection edge 420 could be curved, wavy, or configured to have protruding features. Furthermore, the connection edge 420 is shown having a consistent angle, with respect to the top surface 414 of the compensation prism 412, over the length of the edge, but the angle may vary, while not being less than ninety degrees, along the length of the connection edge 420. The angles and shapes given to the connection edge 410 of the waveguide prism 402 and the connection edge 420 of the compensation prism 412 are complementary to each other, such that the surfaces of the connection edges 410, 420 can be fit together flush, without gaps, to form a complete disc, as when bonded at block 312 illustrated in FIG. 3. While the connected compensation prism 412 and waveguide prism 402 are shown as a disc, the compensation prism 412 and the waveguide prism 402 may be formed in any other shape suitable for cutting by optical lens cutting equipment.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display comprising:
a combiner, configured to receive display light from a micro-display, having a world-side surface and an eye-side surface, the world-side surface having a first curvature corresponding to a user's vision correction prescription, wherein the combiner comprises a waveguide prism coupled to a compensation prism with a polarization beam splitting (PBS) film layer and a linear polarization film layer disposed between the waveguide prism and the compensation prism; and
a corrective layer, disposed on the eye-side surface of the combiner, having an eye-side surface configured to have a second curvature corresponding to the user's vision correction prescription.

2. The head mounted display of claim 1, wherein an air gap is maintained between the combiner and the corrective layer.

3. The head mounted display of claim 1, further comprising:
a quarter wave plate layer disposed between the combiner and the corrective layer.

4. The head mounted display of claim 1, further comprising:
an output film stack layer disposed on the eye-side surface of the corrective layer.

5. The head mounted display of claim 1, wherein the combiner comprises the waveguide prism coupled to the compensation prism such that a portion of the waveguide prism and a portion of the compensation prism form the world-side surface of the combiner.

6. The head mounted display of claim 5, wherein the waveguide prism and the compensation prism each have a vertical height that is less than the vertical height of the combiner.

7. An optical combiner configured to be mounted in a head mounted display, the optical combiner comprising:
a world-side surface comprising a waveguide prism coupled to a compensation prism, the world-side surface having a first curvature, wherein a polarization beam splitting (PBS) film layer and a linear polarization film layer are disposed between the waveguide prism and the compensation prism; and
an eye-side surface comprising a corrective layer having a second curvature,
wherein the first curvature and the second curvature correspond to a user's vision correction prescription diopter.

8. The optical combiner of claim 7, further comprising:
an output film stack layer disposed on the corrective layer.

9. The optical combiner of claim 8, wherein the output film stack layer comprises:
a linear polarization film layer disposed on a polarization beam splitting (PBS) film layer; and
a quarter wave plate (QWP) film layer disposed on the PBS film layer.

10. The optical combiner of claim 7, further comprising all the linear polarization film layer disposed between the PBS film layer and the waveguide prism.

11. The optical combiner of claim 7, wherein the waveguide prism and the compensation prism each have a vertical height that is less than the vertical height of the optical combiner.

12. The optical combiner of claim 7, wherein the waveguide prism is configured to convey display light, via multiple reflections, from an incoupler region of the waveguide prism to an outcoupler region of the waveguide prism in order to display an image to a user.

13. A method comprising:
receiving a lens blank including at least a first surface, formed from a waveguide prism and a compensation prism, wherein a polarization beam splitting (PBS) film layer and a linear polarization film layer are disposed between the waveguide prism and the compensation prism, and a second surface, formed from an optical material, wherein the first and second surfaces have curvatures corresponding to a user's vision correction prescription; and
adhering an output film stack layer to the second surface.

14. The method of claim 13, wherein the output film stack layer comprises:
a linear polarization film layer disposed on a polarization beam splitting (PBS) film layer; and
a quarter wave plate (QWP) film layer disposed on the PBS film layer.

15. The method of claim 14, wherein adhering the output film stack layer to the second surface comprises adhering the QWP film layer to the second surface.

16. The method of claim 13, wherein the linear polarization film layer is disposed between the PBS film layer and the waveguide prism.

17. The method of claim 13, wherein microspheres are disposed between the first and second surfaces within the lens blank to form an air gap.

18. The method of claim 13, wherein a QWP film layer is disposed between the first and second surfaces within the lens blank.

* * * * *